Oct. 11, 1932.                F. KUHN ET AL                    1,881,695
                               ELECTRIC IRON
                            Filed March 18, 1929
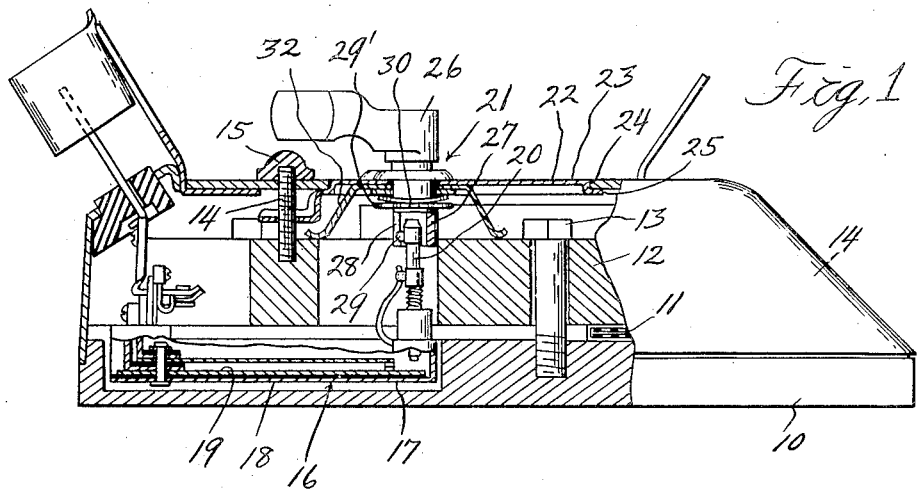
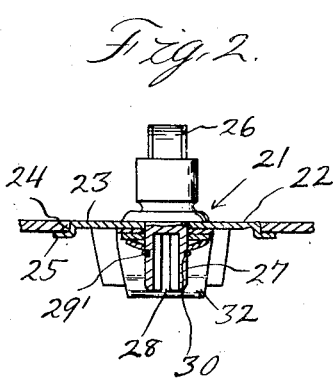
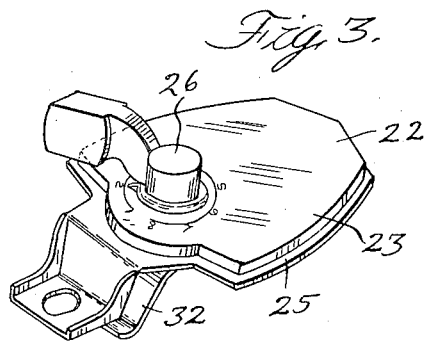
INVENTORS
Frank Kuhn
Laurence H. Thomas
BY
ATTORNEYS Patented Oct. 11, 1932

1,881,695

UNITED STATES PATENT OFFICE

FRANK KUHN AND LAURENCE H. THOMAS, OF DETROIT, MICHIGAN, ASSIGNORS TO AMERICAN ELECTRICAL HEATER COMPANY, OF DETROIT, MICHIGAN, A CORPORATION OF MICHIGAN

ELECTRIC IRON

Application filed March 18, 1929. Serial No. 348,065.

This invention relates generally to electric heaters and concerns itself more particularly with that type of heater having a switch associated with the heating element and having control means for the switch mounted for manual operation exteriorly of the heater.

One of the primary objects of this invention is to provide a control unit for the switch mounted independent of the cover for the heater and free from connection with any part of the latter. The arrangement is such as to permit the control means to be readily assembled upon the heater as a unit without the necessity of manipulating any securing means.

Other objects and novel features of construction of the present invention will be made more apparent as this description proceeds, especially when considered in connection with the accompanying drawing wherein:

Figure 1 is a fragmentary sectional view of a heater constructed in accordance with this invention;

Figure 2 is a sectional view taken at substantially right angles to the section aforesaid;

Figure 3 is a perspective view of the control unit.

For the purpose of illustration we have shown our invention as applied to an electric iron. As shown in Figure 1 of the drawing the iron comprises a heat distributing base 10, a heating element 11 seated upon the base, a body portion or pressure plate 12 clamped to the heating element by means of bolts 13 threaded into the base 10 and a cover 14 also seated upon the base 10 and concealing the parts aforesaid of the iron. The cover is preferably held in assembled position upon the base by means of a stud element 14' extending upwardly from the pressure plate and projecting through a suitable opening formed in the top surface of the iron for receiving a clamping nut 15.

The operation of the heating element is preferably controlled in the present instance by means of a thermostatic switch 16 comprising a casing 17 and bi-metallic thermostatic strips 18 and 19 having the rear ends thereof secured in spaced relation to the casing. As shown, each bi-metallic strip extends outwardly from its point of support and the free ends thereof are provided with suitable contacts adapted to cooperate for completing the electric circuit to the heating element. The two strips are otherwise insulated from each other and are so constructed and arranged that under increasing temperature conditions both elements are deflected laterally in the same direction, and in the construction shown both the strips 18 and 19 move away from the base of the casing upon increase in temperature. For breaking the circuit to the heating element an adjustable stop 20 is provided having its lower end arranged in the path of travel of the bottom strip 18 in such a manner as to engage the outer end thereof when the deflection of the same corresponds to a predetermined temperature.

The upper end of the adjustable stop preferably extends through a suitable aperture formed in the pressure plate 12 and terminates adjacent the cover 14. The arrangement is such that upon a rise in temperature both of the thermostatic elements move laterally away from the base of the casing 17 until the lower strip 18 strikes the end of the adjustable stop 20, whereupon further movement of the strip 18 is retarded and further increase in temperature causes the upper strip 19 to move away therefrom and separate the contacts.

For actuating the adjustable stop 20 to vary the temperature at which the switch operates to break the circuit we provide suitable control means 21 free from any connection with the heater and capable of being assembled with or detached from the latter as a unit. The control unit comprises a plate 22 having an embossed surface 23 adapted to project through a correspondingly shaped opening 24 formed in the top surface of the cover 14. The plate is further provided with a marginal portion 25 surrounding the embossed portion aforesaid and engageable with the under surface of the cover adjacent the opening 24. As shown in Figures 1 and 2 of the drawing the top surface of the embossed portion 23 is arranged substantially flush with the top surface of the cover so as to form in effect a continuation of the latter.

Rotatably and permanently mounted upon the substantially flat embossed portion 23 of the plate is a control arm 26 having a sleeve-like portion 27 extending through an opening formed in the embossed portion and adapted to detachably receive the upper end of the adjustable element 20. The detachable driving connection between the sleeve-like portion 27 and the adjustable element 14 is accomplished by forming an elongated slot 28 in the sleeve-like portion of sufficient width to receive a projection 29 extending laterally from the adjustable element. The control arm 26 is secured to the plate 22 to form a unitary construction therewith by means of a spring clip 29' engageable in an annular recess 30 formed in the sleeve-like portion 27.

The control unit 21 is preferably held in spaced relation to the body portion 12 of the heater by means of a spring metal substantially inverted U-shaped member 32 having its base secured to the plate 22 and having the leg portions thereof flared outwardly and seated upon the body portion 12. The arrangement is such that when the cover is assembled upon the heater as shown in Figure 1, the leg portions of the member will be placed under compression. In other words, the leg portions of the member 32 exert an upward force upon the plate 22 to normally restrain the marginal portion 25 thereof in engagement with the bottom surface of the cover adjacent the opening 24. In order to facilitate assembly of the cover upon the heater and to compensate for any slight inaccuracies in manufacture the adjustable element 20 is capable of universal movement relative to the cover. The arrangement is such as to permit the control unit to be shifted relative to the cover prior to assembling the latter upon the heater so that a proper engagement of the embossed portion in the opening 24 is insured.

Thus from the foregoing it will be noted that we have provided a control unit for adjusting the thermostatic switch which is mounted independent of the cover and is free from positive connection with any part of the heater.

What we claim as our invention is:

1. In an electric heater, the combination with a cover and a heating element, of a switch for controlling the operation of the heating element, a control unit for controlling the operation of the switch, said unit including a plate having a portion disposed beneath the cover and having another portion projecting into an opening formed in the latter and arranged flush with the top surface of the cover, and a control arm mounted upon the projecting portion aforesaid of the plate and operatively connected to the switch.

2. An electric heater having in combination, a body portion, a heating element, a cover for said body portion and heating element, a switch for controlling the operation of the heating element, control means for the switch removable as a unit from the heater, said means including a plate supported upon the body portion and having an embossed surface projecting into a correspondingly shaped opening formed in the cover and arranged flush with the top surface of the latter, and a control arm permanently fixed to the embossed surface aforesaid and having a portion detachably connected to the switch.

3. An electric heater having in combination, a heating element, a cover for the heating element and having an opening therein, a switch for controlling the operation of the heating element, control means for the switch including a plate disposed within the opening aforesaid in the cover and having a portion normally restrained in engagement with the cover, and a control arm mounted upon the exposed portion of the plate and operatively connected to the switch.

4. An electric heater having in combination, a heating element, a cover for the heating element having an opening therein, a switch for controlling the operation of the heating element, control means for the switch including a plate disposed within the cover in a position to form a closure for the opening aforesaid in the cover and having a marginal portion normally restrained into engagement with the under surface of the cover for holding the same in assembled position upon the heater, and a control element carried by the portion of the plate exposed through the opening in the cover and operatively connected to the switch.

5. An electric heater having in combination, a heating element, a cover for the heating element having an opening therein, a switch for controlling the operation of the heating element, a control unit for the switch including, a plate having a portion projecting into the opening aforesaid in the cover and arranged substantially flush with the top surface of the latter and having a marginal portion normally restrained into engagement with the under surface of the cover, and a control arm mounted upon the projecting portion aforesaid of the plate and operatively connected to the switch.

6. An electric heater having in combination, a heating element, a cover for said heating element having an opening therein, a switch for controlling the operation of the heating element, and means for controlling the operation of the switch including, a plate having an embossed portion conforming to the shape of the opening in the cover and projecting into the same forming in effect a continuation of the top surface of the cover, said plate having a marginal portion surrounding the embossing portion aforesaid and normally restrained into engagement with the portion of the cover adjacent the opening, and a control member carried by the embossed portion and operatively connected to the switch.

7. An electric heater having in combination, a body portion, a heating element, a switch for controlling the operation of the heating element, a cover for concealing the parts aforesaid of the heater, means for controlling the operation of the switch from a point exteriorly of the cover, said means including a control unit seated upon the body portion and normally restrained in engagement with the cover for holding the same in assembled relation with the heater.

8. In an electric heater, the combination with a cover having an opening therein and a heating element, of a switch for controlling the operation of the heating element, and means for controlling the switch from a point exteriorly of the cover including, a control unit having a portion extending through the opening and having another portion engageable with the under surface of the cover adjacent the opening, and yieldable means normally restraining said last mentioned portion into engagement with the cover for holding the control unit in assembled position.

9. An electric heater having in combination, a heating element, a cover for the heating element having an opening therein, a switch for controlling the operation of the heating element, and a control unit operatively connected to the switch for controlling the same, said unit including, a plate having a portion projecting into the opening aforesaid in the cover and arranged substantially flush with the top surface of the latter and having a marginal portion engageable with the under surface of the cover adjacent the opening, and yieldable means normally restraining said marginal portion into engagement with the cover to hold the control unit in assembled position.

10. An electric heater having in combination, a heating element, a switch for controlling the operation of the heating element, a cover substantially incasing the heating element and switch, and a control unit for actuating the switch from a point exteriorly of the heater, said control unit comprising a control arm projecting through an aperture in the cover, and means for supporting the control arm including a member interposed between a part of the heater and cover and yieldable means normally urging said member into engagement with the cover for holding said control unit in assembled relation with the heater.

11. In an electric heater, the combination with a cover having an opening therein and a heating element concealed by said cover, of a switch for regulating the operation of the heating element, and means for controlling the switch from a point exteriorly of the cover, said means including a member located within the cover in registration with the opening therethrough and carrying a control element extending through the said opening, and means for yieldably clamping said member against the inner surface of the cover surrounding the opening for maintaining said member in assembled relation with the cover.

12. An electric heater having in combination, a heating element, a switch for regulating the operation of the heating element, a cover substantially enclosing the heating element and switch and having an opening therethrough, means operatively connected to the switch for controlling the operation of the same, said means including a member disposed within the cover in registration with the opening and having the marginal portions thereof engageable with the inner surface of the cover surrounding the opening, a control arm carried by said member and projecting through the opening for manipulation from a point exteriorly of the cover, and yieldable means arranged under tension between the said member and a fixed part of the heater when the latter is in assembled relation for clamping the member with the control element thereon in position.

In testimony whereof we affix our signatures.

FRANK KUHN.
LAURENCE H. THOMAS.